3,202,449
ARTICLE MANIPULATION DEVICE
Jerome H. Lemelson, 85 Rector St., Metuchen, N.J.
Filed Apr. 29, 1963, Ser. No. 276,622
4 Claims. (Cl. 294—88)

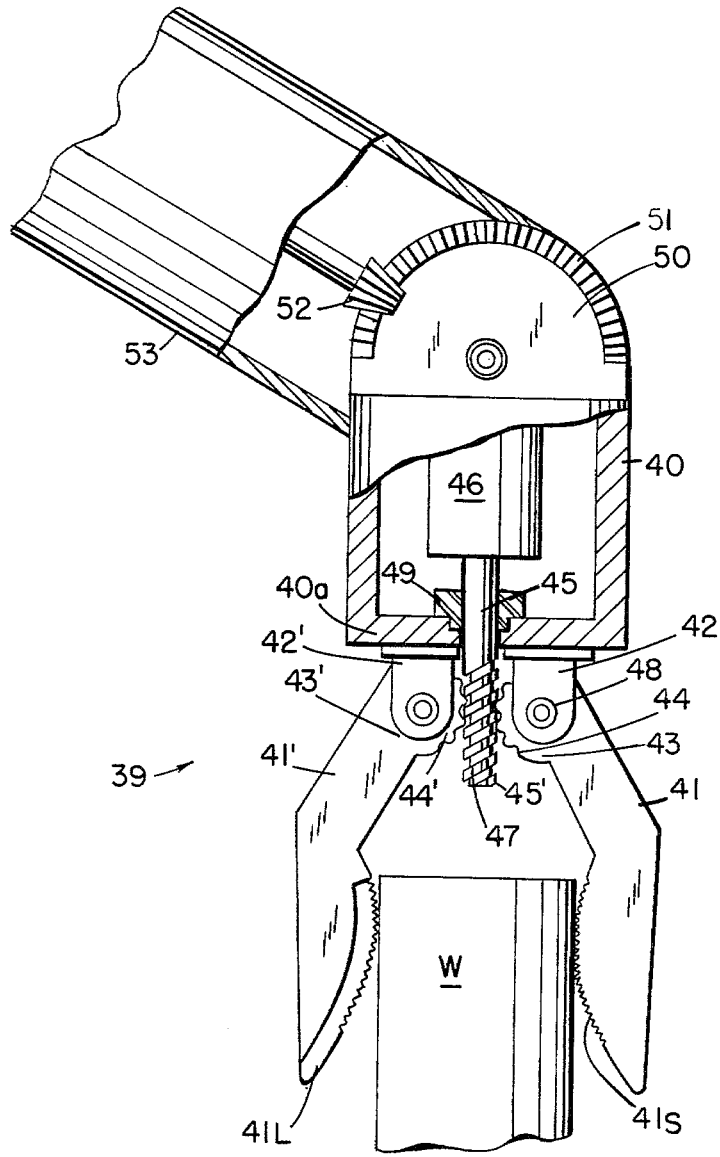

This invention relates to article manipulation devices and is a continuation-in-part of my copending application Ser. No. 477,467, filed December 24, 1954 for Automatic Conveying Apparatus, now abandoned.

It is a primary object of this invention to provide a new and improved article retaining device.

Another object is to provide an improved device for retaining or holding an article by clampingly engaging opposite surfaces of said article.

Another object is to provide a simplified handling apparatus employing but a single motor which is operative to open and close a clamping means for engaging and disengaging work disposed therebetween.

With the above and other such objects in view, as may hereinafter more fully apear, the invention consists of the novel construction, combination and arrangement of parts as will hereinafter be more fully described, and illustrated in the accompanying drawings wherein is shown embodiments of this invention, but it is to be understood that changes, variations and modifications may be resorted to which fall within the scope of the invention as claimed.

The single drawing is a side view with parts broken away for clarity of a portion of an article manipulation device.

The drawing shows part of an article manipulator assembly 39 applicable for seizing, positioning and transferring articles by compressive engagement of opposite surfaces thereof. The assembly 39 includes a base 40 which may be movably mounted on another base or arm 53 and positionally controllable to position a pair of jaws or clamps 41 and 41' which are movable to close and open against a workpiece W by means of a reversible electric motor 46 having a shaft 45 operatively coupled to said jaws. The motor 46 is secured within the housing or base 40 with its shaft 45 having a helical worm gear 47 provided along said shaft and operative to engage and simultaneously rotate each of the jaws from positions whereby they are completely open to positions where they engage respective faces of the work W as shown. The shaft 45 is shown near its end portion 45' with a worm gear helical formation 47. Each of the clamps or jaw members 41 and 41' has respective base portions 43 and 43' shaped with teeth formations 44 and 44' adapted to be engaged by respective portions of the helical formation 47 formed in the end of shaft 45. The base of gear portion of each jaw member is also drilled and fitted with a bushing 48 through which a pin or shaft supported by respectve brackets 42 and 42', extends. The brackets or journal-supports are formed of the material of the base 40 or comprise respective pillow blocks secured thereto as shown. The rear portion of shaft 45 is cylindrical and is supported by a bearing 49 secured to the end wall 40a of the housing 40 as the shaft is rotated.

The motor 46 is preferably operative such that, upon rotation in one direction, it will open the jaws a maximum degree according to the largest article to be handled. Rotation of the shaft 45 in the other direction may be effected until a predetermined back-force is exerted thereon when the inside surfaces of the jaws compressively engage the work with a predetermined force.

The rearmost portion of base 40 is provided with a semi-circular gear plate 50 secured thereto or integrally formed by molding or casting on the end of 40 and having teeth 51 disposed to permit engagement with a driven gear 52 associated with the base 53 on which the assembly is mounted.

Notation 41S refers to serrations povided in the clamping surface of the jaw members and 41L to a rubber or plastic sleeve which may be secured to said jaws to provide a boot for engaging the surface of the article to be handled without scratching or marring said surface.

Control of the motor rotating shaft 50 will determine the degrees the jaws open and close which will be predetermined by the shape and size of the article to be handled.

I claim:

1. Article handling apparatus comprising in combination with a base, a pair of article clamping members, means for pivotally mounting said clamping members on said base whereby said members may be opened and closed against an article for clampingly engaging and retaining said article, reversible motor means mounted on said base, a drive-shaft extending from said motor means, a worm gear provided on said shaft, portions of each of said clamping members being shaped with gear teeth which engage the worm gear and extend radially away from the pivotal axis of said member whereby rotation of said shaft by said motor means will simultaneously drive both said clamping members in rotation about their respective axes either together or apart for engaging and releasing articles between said clamping members.

2. Article handling apparatus comprising in combination with a base, first and second article clamping members, means for pivotally supporting said article clamping members with respect to said base for the movement of each member to engage opposite surfaces of an article to be handled by said apparatus, reversible servo means supported by said base and including an output shaft operative to rotate in two directions depending on the mode of operation of said reversible servo means, helical gear means provided on said shaft, further gear means connected to each of said clamping members and operatively engaging respective portions of said helical gear means to be simultaneously rotated about said pivotal supports as said helical gear means rotates, said servo means being operative to simultaneously drive both said clamping members in rotation for engaging and releasing articles disposed between said clamping members.

3. Article handling apparatus in accordance with claim 2, said clamping members defining respective jaws of an article manipulation device and being variably openable and closable depending on the degree and direction of rotation of said output shaft of said servo means.

4. Article handling apparatus comprising in combination with a base, first and second article holding members, means for pivotally supporting said article holding members with respect to said base for the movement of each member to engage and hold respective portions of an article to be handled by said apparatus, reversible motor means suported by said base having an output shaft operative to rotate in two directions depending on the mode of operation of said reversible motor means, helical gear means provided on said shaft, further gear means connected to each of said holding members and operatively engaging respective portions of said helical gear means to simultaneously rotate about said pivotal supports as said helical gear means rotates, said motor means being operative to simultaneously drive both said holding members in rotation for engaging and releasing articles disposed between said holding members.

References Cited by the Examiner

UNITED STATES PATENTS

| | | | |
|---|---|---|---|
| 812,929 | 2/06 | Kernin | 294—106 |
| 1,252,280 | 1/18 | McDonald | 294—65.5 |
| 1,630,456 | 5/27 | Wehr | 294—88 |
| 2,129,158 | 9/38 | Williams | 294—88 X |
| 2,600,849 | 1/52 | Collins | 294—88 X |
| 2,623,774 | 12/52 | Hubbard | 294—65.5 |
| 2,693,979 | 11/54 | Russell | 294—65.5 |
| 3,016,260 | 1/62 | Schrader | 294—88 |
| 3,061,351 | 10/62 | Johnson | 294—64 |

SAMUEL F. COLEMAN, *Primary Examiner.*

ERNEST A. FALLER, JR., *Examiner.*